United States Patent [19]

Gage

[11] 3,934,943
[45] Jan. 27, 1976

[54] ENDLESS TRACK ADAPTED FOR USE WITH TRACK LAYING VEHICLES

[76] Inventor: Rodney E. Gage, 9815 Lemona Ave., Sepulveda, Calif. 91343

[22] Filed: Mar. 29, 1974

[21] Appl. No.: 456,320

[52] U.S. Cl............................ 305/35 EB; 180/9.44
[51] Int. Cl.²....................................... B62D 55/24
[58] Field of Search......... 305/53, 35 EB; 180/92 R, 180/944; 74/239, 247, 242.1 P

[56] References Cited
UNITED STATES PATENTS

| | | | |
|---|---|---|---|
| 3,464,743 | 9/1969 | Hallaman | 305/35 EB |
| 3,582,154 | 6/1971 | Russ | 305/35 EB |
| 3,612,625 | 10/1971 | Huber | 305/35 EB |
| 3,623,780 | 11/1971 | Kell | 305/35 EB |
| 3,774,979 | 11/1973 | Harris | 305/35 EB |
| 3,794,155 | 2/1974 | Bechtel | 74/239 |
| 3,838,894 | 10/1974 | Reedy | 305/35 EB |

*Primary Examiner*—Philip Goodman
*Assistant Examiner*—John A. Carroll
*Attorney, Agent, or Firm*—Herzig & Walsh, Incorporated

[57] ABSTRACT

An endless track belt adapted for use on all types of track laying vehicles. The track is constructed to have the capability of utilizing ground material coherence as a primary means of flotation. In the exemplary form, the track is in the form of a grid having longitudinal tension elements, transverse elements preferably fabricated from elastomeric materials, but not limited thereto. It has the characteristic of inherent low mass-to-floatation surface area ratio and to be operable at a high velocity. The grid is an open network, minimizing total quantitative belt section relative to ground area encompassed. The grid has lateral flexibility allowing for lateral displacement or deviation into a curved configuration for steering.

8 Claims, 17 Drawing Figures

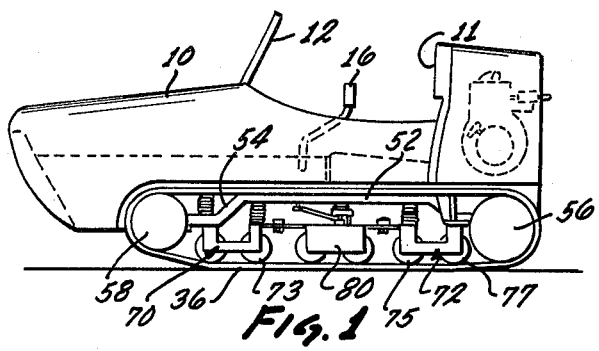
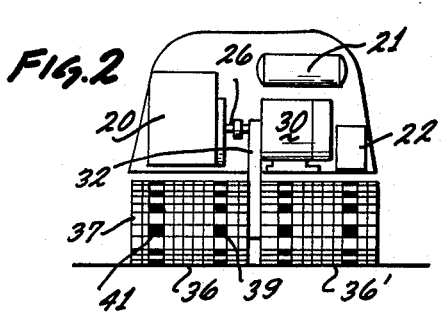
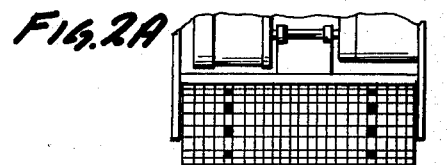
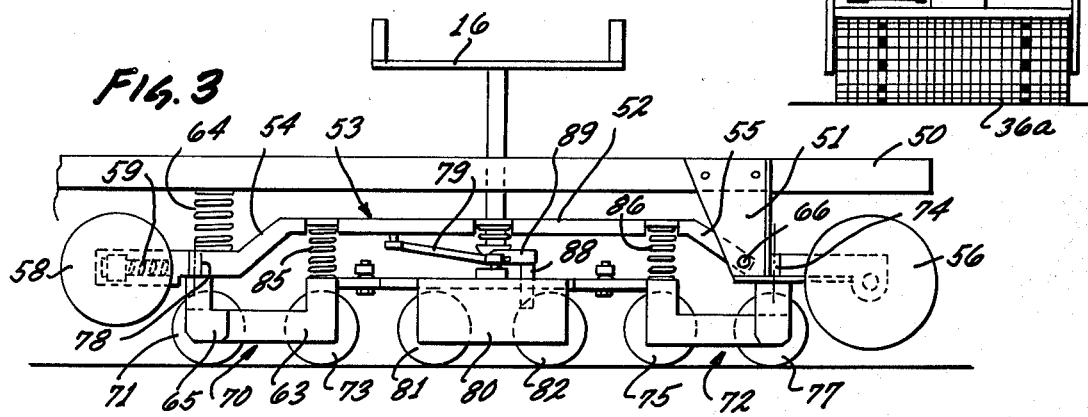
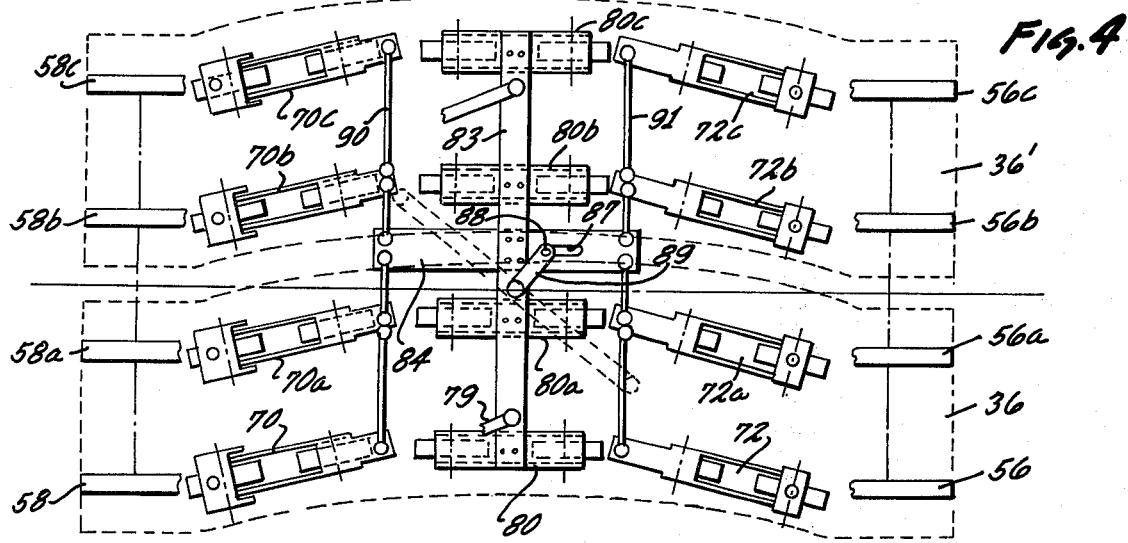
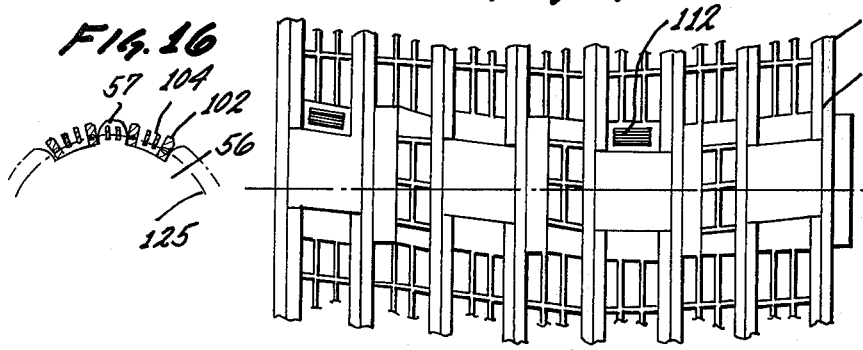
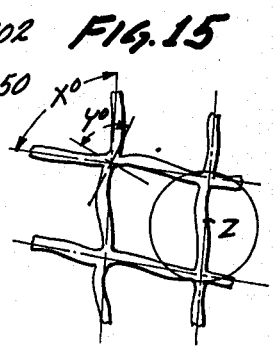

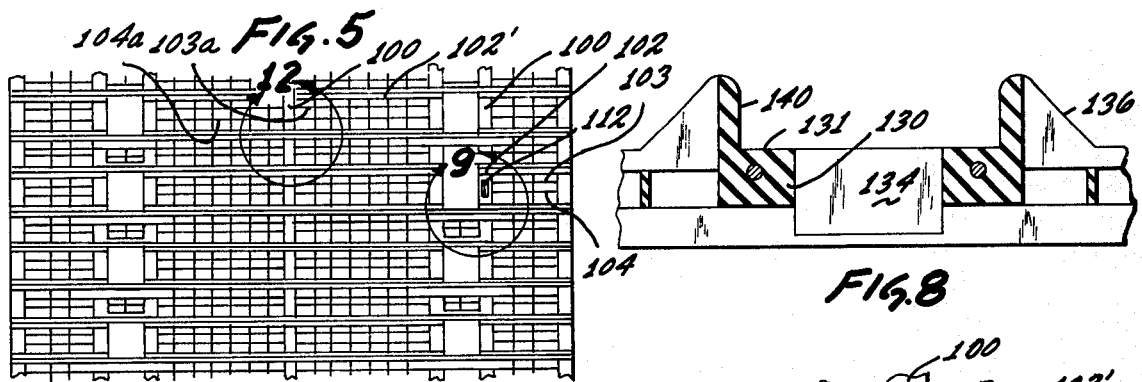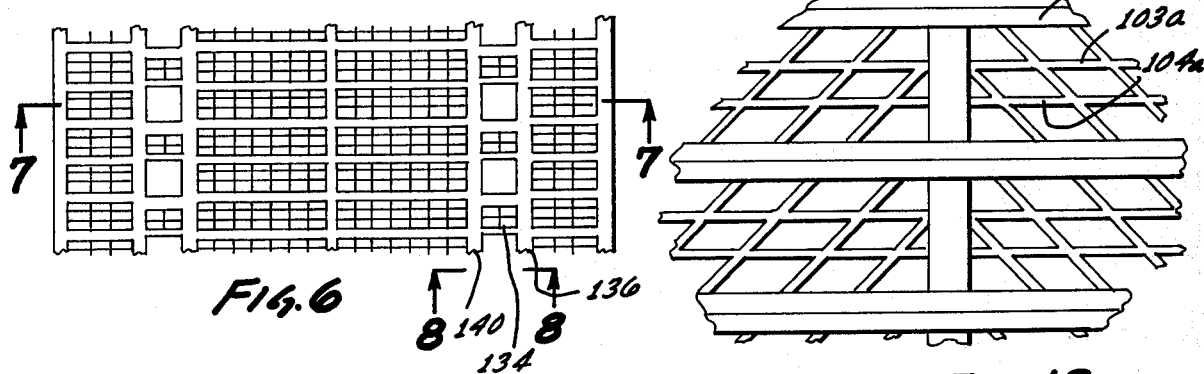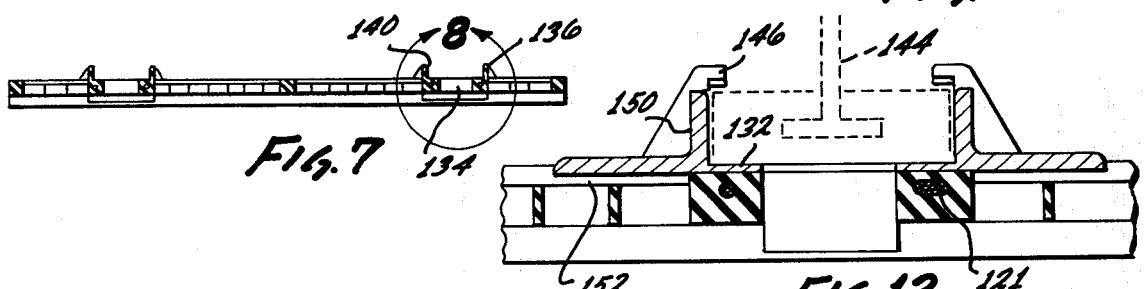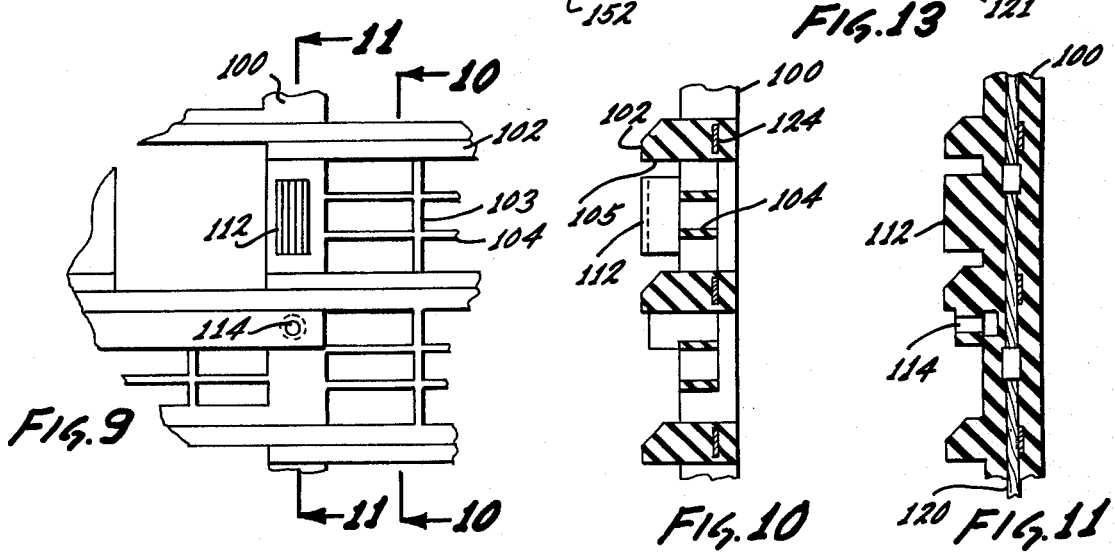

ENDLESS TRACK ADAPTED FOR USE WITH TRACK LAYING VEHICLES

FIELD OF THE INVENTION

The field of the invention is that of endless belts or tracks which are particularly adapted for use on track laying vehicles, but which are adapted to other uses, such as in conveyors and more specially, wherein the characteristic of the track being able to deviate laterally for turning is needed.

BACKGROUND OF THE INVENTION

In the exemplary form of the invention, it is illustrated as utilized in a track laying vehicle such as a snowmobile. With respect to the particular art of endless tracks or treads, reference is made to U.S. Pat. Nos. 1,756,770; 2,899,242; 3,508,796; 3,545,822; and 3,715,146. Also, reference is made to U.S. Pat. Nos. 1,678,149; 2,732,265; 2,754,157; 3,416,645; and 3,467,239. With respect more particularly to vehicles, reference is made to U.S. Pat. Nos. 758,757; 789,974; 1,069,159; 1,129,637; 2,356,528; 3,548,962; and 3,565,198.

The endless track of the invention is wholly unique with respect to the prior art in respect of its being a flexible grid of longitudinal tension elements and transverse elements. Thus, it is provided with the capability of being deviated, deflected, or displaced laterally for purposes of turning, that is, moving in an arc. The particular characteristics of the endless track belt and its specific objects as set forth hereinafter represent qualities and capabilities entirely lacking in the prior art.

SUMMARY OF THE INVENTION

In the exemplary form as disclosed herein, the invention is a flexible grid having longitudinal tension elements and transverse rib-like elements, preferably fabricated from elastomeric materials, although it is not limited to specific materials. The article is characterized primarily by its inherent low mass-to-flotation surface area ratio for operation at high track velocity. The elements of the belt are in spacial relation providing an open network minimizing the total quantitative belt section relative to the ground area encompassed.

The construction and characteristics of the belt are calculated to realize a number of objectives in addition to those already set forth.

The minimal flexural modulus inherent to the construction of the track provides reduced wear and fatigue due to lessened heat generation and improved heat transfer to the atmosphere resulting from high track surface area-to-mass ratio.

The relationship of the elements of the track is such as to utilize the natural property of ground surface material to cohere under light compactive force. Thus, it resists extrusion through the interelement openings to any detrimental degree.

The elements of the track are constructed to serve a variety of secondary functional purposes. One of these is that the track is configurated to provide sprocket engagement side guides, suspension wheel tracks, slider tracks, lateral antiskid traction means, and to provide for the affixing of ice grip studs.

A further object is that the transverse elements are configurated to compensate for proportional deflection loads for which they must accommodate.

A further object is to realize reinforcement in the primary longitudinal tension elements against tension stresses by way of reinforcing insert strands of cord or the like.

A further object is to realize reinforcement against deflectional stresses in the drive axis by the insertion of metallic bands in flat position relative to the track axis. These bands are flexible in a flat axis to eliminate significant resistance to ground surface compliance while restraining deflection in the drive axis.

Lateral deflectibility of the primary belt is an inherent property of the invention. A primary object is the realization of this characteristic or capability.

BRIEF DESCRIPTION OF THE DRAWINGS

Further objects and additional advantages of the invention will become apparent from the following detailed description and annexed drawings, wherein:

FIG. 1 is a schematic elevational view of a snowmobile equipped with the endless track of the invention;

FIG. 2 is a rear view of the vehicle of FIG. 1;

FIG. 2A is a rear view of a modified vehicle having a single belt;

FIG. 3 is a partially enlarged schematic view illustrating the steering mechanism of the vehicle of FIGS. 1 and 2;

FIG. 4 is a plan view illustrating lateral deviation or displacement of certain members of the vehicle for purposes of steering;

FIG. 5 is a plan view of the ground surface side (exterior) view of a section of track;

FIG. 6 is a plan view of the suspension side (interior) view of the endless track;

FIG. 7 is a sectional view taken on line 7—7 of FIG. 6;

FIG. 8 is a sectional view taken along line 8—8 of FIG. 6;

FIG. 9 is a enlarged detail view of a section of the track of FIG. 5;

FIG. 10 is a sectional view taken along line 10—10 of FIG. 9;

FIG. 11 is a sectional view taken along line 11—11 of FIG. 9;

FIG. 12 is an enlarged detail view of a section of modified form of track;

FIG. 13 is a sectional view showing a modified track construction;

FIG. 14 is a view of the track in laterally deviated or displaced configuration.

FIG. 15 is an enlarged detail view illustrating the distortion of grid elements during deflection; and FIG. 16 is a detail view illustrating the transverse grid elements having their sectional center lines outside the pitch circle of the track belt.

DESCRIPTION OF THE PREFERRED EMBODIMENTS

As previously pointed out, the endless track of the invention has particular characteristics adapting it for various types of utilization and in various environments, one of which is utilization in a track laying vehicle, such as a snowmobile. It could be utilized as a conveyor belt. It can be used in other all-terrain vehicles, such as golf carts, etc. It is especially suitable for applications utilizing its inherent low mass-to-floation surface area ratio for operation at high track velocity. The track has the characteristic of minimal flexural modulus inherent in it providing for reduced wear and fatigue due to lessened heat generation and improved heat transfer to the atmosphere resulting from high track surface area-to-mass ratio.

FIGS. 1, 2 and 3 show schematically a small tracklaying vehicle which is specifically shown as a snowmobile. The vehicle shown in merely exemplary of types of vehicles that the track of the invention can be used with. For example, the vehicle might be that of U.S. Pat. No. 1,756,720 of Venzlaff. The vehicle as shown has an outer body shell 10 which may have a configuration as shown including a seat back 11 and a wind shield or screen 12. Numeral 16 designates a steering handle on stem 17 which will be referred to again presently. Numeral 20 designates the prime mover which may be a type of gasoline engine. Numeral 21 designates a gasoline tank, and numeral 22 designates a storage battery. Numeral 26 designates a transmission or coupling device coupled between prime mover 20 and a variable ratio device or transmission 30. Numeral 32 designates a driving connection which may be a belt or sprocket chain providing for drive from the transmission to an axle or drive assembly.

The endless track or drive belts are designated at 36 and 36'. More than one track may be provided. Belt or track 36 has longitudinal tension members and transverse track belt ribs as will be described in connection with FIGS. 5–13. The belt also has apertures or openings as will be described, providing sprocket tooth engagement means.

FIG. 2A shows a similar vehicle having only a single belt 36a. Two or more belts may be used.

Numeral 50 designates a primary chassis having side frame members having a configuration as designated at 51, supporting longitudinal members, one of which is designated at 52. Longitudinal member 52 includes offset parts 54 and 55. These members form the suspension and track guide assembly 53. Numeral 56 designates one of several drive sprockets on a common drive shaft. Numeral 58 designates one of several track tension idler wheels on a common shaft. Idler 58 is biased by coil spring 59. Idlers 58 are carried at the forward end of the suspension and track guide assembly 53, which is resiliently spaced from chassis 50 by way of coil springs shown at 64. The suspension assembly or frame 53 is pivotally supported at the rear end on pivots or journals as shown at 66 carried by members as designated at 51.

As will be described presently, the endless track (or track belts) of the invention has the characteristic of lateral flexibility, that is, resiliency by reason of its grid construction being formed of longitudinal tension elements and transverse riblike elements as will be described. The vehicle is provided with displaceable, that is, steerable trucks which carry the endless belt and which displace it laterally.

Numerals 70 and 72 designate front and rear displaceable guide trucks laterally alginned as shown in FIG. 4. Each truck is formed as a U-shaped frame, truck 70 having wheels 71 and 73, and truck 72 having wheels 75 and 77 carried on horizontal pivot shafts. Truck 70 is mounted to swivel with respect to castor pivot 78 carried by frame 53, and truck 72 is mounted to swivel with respect to castor pivot 74 carried by frame 53. Truck 70 has a main part 63 and a front part 65. Part 63 is pivoted or journalled on the axle of wheel 71. Truck 72 is of similar construction, having a forward part pivoted on the axle of wheel 77.

Numeral 80 designates an intermediate truck having wheels 81 and 82 carried on horizontal pivot shafts. The intermediate trucks are attached to transverse deflection beam member 83 which is in turn attached to fore and aft control beam member 84. The forward and rear trucks 70 and 72 are supported from frame 53 by truck support springs 85 and 86. Numerals 79 and 79' designate parallel guide links pivotally attached to member 83 and to frame 53 to laterally guide beam 83.

Fore and aft member 84 has a slot 87 in it which is engaged by pin 88 which is at the end of an arm 89 which extends from steering post 17. In operation, steering stem 17 may be rotated angularly by steering arm 16. By reason of the engagement of pin 88 in slot 87, the members 83 and 84 can be moved laterally to thereby deviate, deflect, or displace guide trucks 80. Forward trucks 70 are connected by tie rods 90, and rear trucks 72 are connected by tie rods 91. Tie rods 90 and 91 are connected to front and rear ends of member 84. Thus, the guide trucks can be deviated laterally into arcuate formations to one side or the other as illustrated in FIG. 4 for purposes of steering. The flexible tracks 36 and 36' are laterally flexible as described and conforms to the displacement into the arcuate configuration so that the vehicle is readily and accurately steered. FIG. 4 illustrates schematically the lateral deviation or displacement of tracks 36 and 36'.

The Endless Track

The endless track itself is disclosed in FIGS. 5 through 13. FIGS. 5 and 6 are plan views of a section of preferred form of track. FIG. 7 is a cross sectional view of the track. FIG. 9 is an enlarged detail view, and FIGS. 10 and 11 are cross sections of FIG. 9.

The track belt consists entirely of longitudinal tension elements 100 interconnected with and by a plurality of the transverse riblike elements 102, there being longitudinal elements 103 of smaller dimension and transverse riblike elements 104 of smaller dimension. The elements are arranged so as to provide an open network or grid which minimizes the total quantitative belt section relative to the ground area encompassed or engaged. A special relationship or gridwork is intended to and calculated to utilize the natural property of ground surface material to cohere under light, compactive force and thus resist extrusion through the interelement openings to any detrimental degree.

Preferably, the track of the invention is fabricated from elastomeric materials and may be fabricated by different manufacturing processes, such as plastic injection molding. It may in fact be fabricated in sections joined at the ends or it may be fabricated in a single piece. The longitudinal and transverse elements primarily have a supportive function; but in the preferred form of the invention, they may have variable configurations so as to serve secondary functional purposes.

The longitudinal tension elements may vary in sectional configuration to secondarily serve as sprocket side guides, as suspension wheel track, slider tracks, and lateral antiskid traction means 112 as shown in FIG. 9. Additionally, the longitudinal tension elements may have means to affix ice grip studs 114 as illustrated in FIG. 9. Variations in construction to serve these additional functions are illustrated in the modified forms shown in cross section in FIGS. 8 and 13 which will be referred to again presently.

The transverse elements may also vary in sectional configuration to secondarily serve the function purpose as sprocket engagement facings, guide track truss or gusset means, and tractive grip means as will be described. Furthermore, the transverse elements may vary in sectional size along their axis line (taper) to provide means to compensate for proportional deflection loads for which the track must accommodate.

As pointed out, both longitudinal and transverse elements may vary in sectional size as identified by 100, 102, 103, and 104. Members of different sizes are referred to as primary and secondary elements providing means calculated to proportional load stressed in accordance with load demands, i.e., in relation to guide engagement. Elements 102 may provide tractive grip surface 105.

In the preferred form of the invention, means are provided to reinforce the primary longitudinal tension elements against tensional stresses by insertion or molding in of endless multistranded, inorganic cord during molding, such as 120 in FIG. 11. Alternatively, there may be inserted a plurality of short lengths of multistranded inorganic cords, each length joined to the succeeding length in overlap matrix of the base elastomer as illustrated in FIG. 13 at 121.

The invention further provides means to reinforce the primary transverse elements against deflectional stresses in the drive axis by insertion or molding in during fabrication metallic bands as designated at 124 in the larger transverse elements as illustrated in FIG. 10 which lie in flat section relative to the track axis. Metallic bands are specifically flexible in the flat axis as a means to eliminate significant resistance to ground surface compliance while restraining deflection in the drive axis.

FIG. 14 shows a section of the track deflected or deviated laterally. FIG. 15 is a detail view illustrating the action at the intersections between secondary grid elements. The elements do not hinge at the intersection points, but what actually happens is that each line element Z distorts into an S shape as shown. The character X° indicates an angle less than 90° which is produced by the distortion resulting in an angle Y° of essentially still 90°. However, its axis (element Z) rotates; and the elements as shown, being of a common size at the intersection, rotate more than the deflection angle. In the vicinity of heavier grid members, it rotates less than the deflection angle. The deflection of the belt, that is, the grid material is facilitated by the beam (element Z) deflection as described in an S manner of configuration. This simple element or beam deflection is significant to the effective operation of the grid belt as opposed to a solid sheet which would have to severely yield, not being able to accommodate to steering requirements.

FIG. 16 is a detail view illustrating a significant feature of the invention. This figure illustrates a section of the track belt passing over sprocket 56, having teeth 57. Secondary transverse elements 104 have their sectional center lines located outside the pitch line or circle 125 of the primary track configuration. This construction has a particular purpose. When the track arcs around the drive axles, that is, around the sprockets, the open spaces between these elements enlarges so as to discharge foreign objects which may have become lodged in the spaces. This is an important function; and in this construction as described, this result is realized in an extremely effective manner.

FIG. 12 is an enlarged detail plan view of a modified form of track section designed to reinforce the track belt against longitudinal deflection in relation to the drive engagement positions through the particular placement, selection, or positioning of transverse elements on a bias, as illustrated. The main longitudinal and transverse elements are designated at 100' and 102'. The other elements are designated at 103a and 104a; elements 103a are on a bias or at an angle parallel to the longitudinal or transverse direction. This construction reinforces the track belt against longitudinal deflection in relation to drive engagement positions through placement of the elements.

FIG. 8 is an enlarged sectional view of a slightly modified form of track which is at a position corresponding to the encircled portion of FIG. 7. The longitudinal tension elements may vary in sectional configuration to secondarily serve as sprocket engagement side guides 130 in FIG. 8, suspension wheel tracks 131, slider tracks 131 (or 132 in FIG. 13), and lateral antiskid traction means 112.

The longitudinal elements may vary in cross sectional configuration as shown to secondarily serve as sprocket engagement facings 134 shown in FIG. 8 to provide guide track trusses 136, and tractive longitudinal guideway facings 140.

Lateral deflection of the primary belt path is controlled through the medium of the longitudinal guideway facings 140 (FIG. 8). Guideway tracks may operate in conjunction with or independent of wheel or slider tracks previously discussed. Lateral flexibility of the primary belt path is an inherent property of the invention as disclosed. Thus, there are means which inhibit lateral deflection where lateral stability is required, or on the other hand, to accomplish controlled track path deflection, if such deflection is required.

FIG. 13 is a cross section similar to that of FIG. 8 which is another slightly modified configuration which provides means to retain running engagement with slider bars by way of guideway bars 144 and rollers by way of partial encompassment by the provision of flange 146 to provide a holding guidetrack. This means is provided as shown by way of an integral configuration. As may be seen in FIG. 13, strips or segments 150 of thermoplastic material having a low wet frictional coefficient, such as TEFLON, may be secured to the basic elastomer of the track belt. Such strips are intended to engage hard, smooth surfaces of the slider and/or guide bars 144. Attachment is by way of thermal welding, secondary molding, inlay molding, adhesive bonding, as at 152, mechanical fastening, mechanical interlock or any combination of these means.

From the foregoing, it can readily be observed how the improved truck is employed with a vehicle such as that of FIGS. 1–4. When steering, the track belt being flexible, is deviated or displaced laterally into an arcuate configuration as illustrated in FIG. 14. Accurate and effective steering is thus possible.

The foregoing disclosure is representative of preferred forms of the invention and is to be interpreted in an illustrative rather than a limiting sense, the invention to be accorded the full scope of the claims appended hereto.

What is claimed is:

1. A track member for an endless track vehicle comprising:
   a plurality of transversely spaced longitudinal members and longitudinally spaced transverse members intersecting said longitudinal members and being integrally joined thereto to define a sheet-like grid with the spaces between said members defining openings completely through said grid;

the thickness of said members in the place of said sheet-like grid being small relative to their dimension normal to said plane;

said grid being of elastomeric material whereby said grid may be bent, in said plane, to arcuate form to effect steering of the vehicle without distorting the plane of said grid.

2. A track member as defined in claim 1 wherein said longitudinal and transverse members are at right angles to each other.

3. A track member as defined in claim 1 wherein some of said transverse members are of larger cross sectional dimension than others and serving as cleats for said endless track.

4. A track member as defined in claim 1 including longitudinal members of a cross sectional shape to define a guide track for a roller wheel.

5. A track member as defined in claim 4 wherein said last-named longitudinal members have openings therein to receive the teeth of a driving sprocket.

6. A track member as defined in claim 1 wherein transverse members extend oblique to said longitudinal members.

7. A track member as defined in claim 1 including reinforcing tension members embedded in at least some of said longitudinal members.

8. A track member as defined in claim 5 wherein said guide track extends substantially along one surface of said sheet-like grid whereby said transverse members will lie outside the pitch line of a sprocket over which said track member may be engaged.

* * * * *